Nov. 20, 1934.   F. S. CURRIE   1,981,310
SKIMMING APPARATUS
Filed Nov. 2, 1932
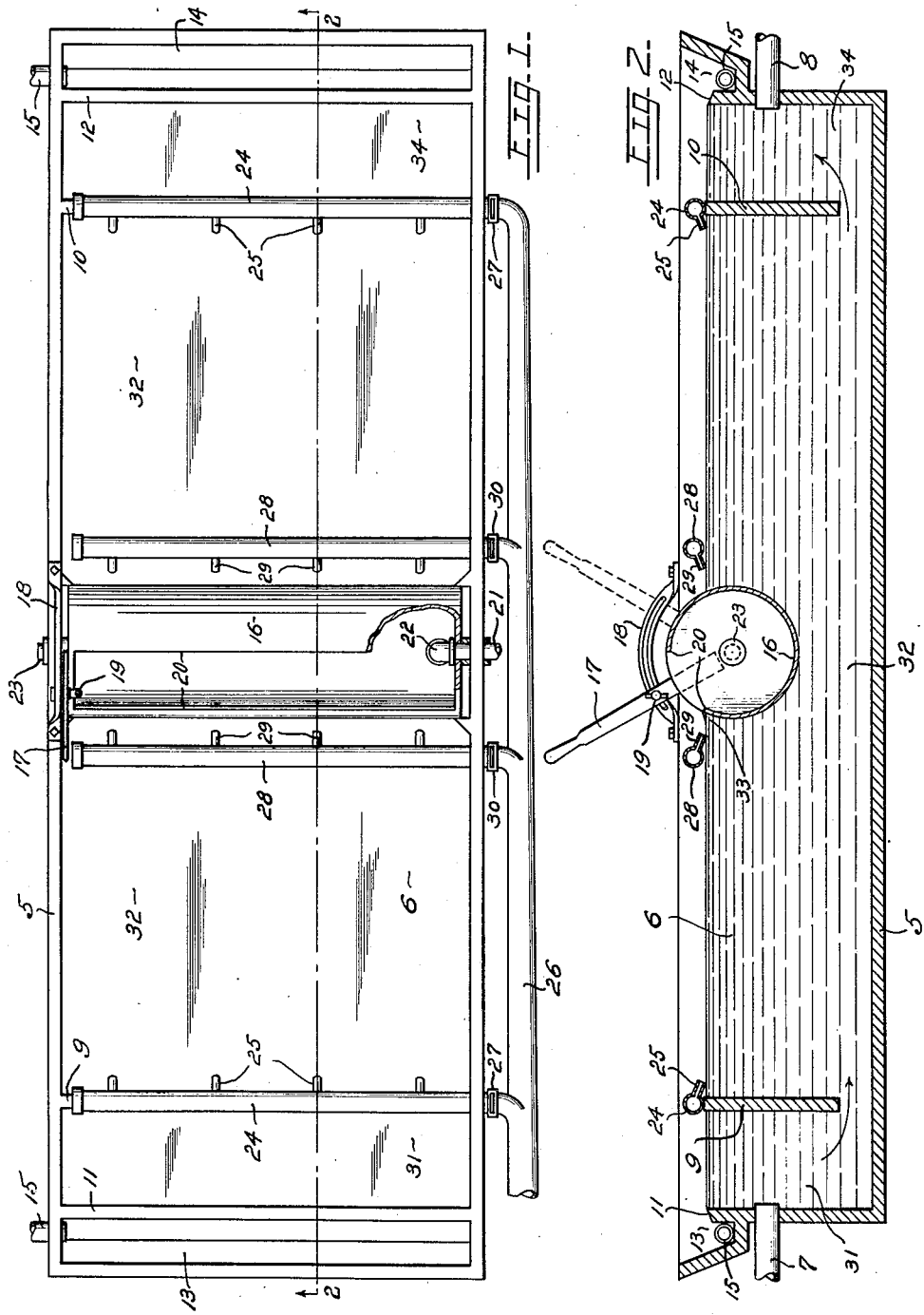
Inventor;
Frank S. Currie,
per Arthur J. Farnsworth.
Attorney.

Patented Nov. 20, 1934

1,981,310

UNITED STATES PATENT OFFICE 1,981,310

SKIMMING APPARATUS

Frank S. Currie, San Bernardino, Calif.

Application November 2, 1932, Serial No. 640,870

4 Claims. (Cl. 210—53)

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to apparatus for skimming the surface of fluids, and it is adapted for use in many fields. Thus; in sewage disposal works, it is particularly well adapted for such purposes as skimming off the floating sludge in sedimentation tanks; and in flotation processes for the treatment of ore, it may be utilized for securing the concentrates. In many other fields, where skimming operations are employed, my device will be found to be of great practical utility.

Among the more salient objects of my invention are; first, to provide skimming apparatus that is adapted for removing practically all of the contents of a fluid mixture that are capable of floating on the surface thereof; second, to afford means for greatly reducing the time and effort that hitherto have been required in skimming operations; third, to supply a method for securing skimmed material in highly concentrated form, and with a corresponding small loss of the carrying fluid; and fourth, to accomplish the aforesaid objects by means of very simple, dependable and relatively inexpensive apparatus.

My objects are attained in the manner illustrated in the accompanying drawing, in which—

Figure 1 is a plan view of an approved form of my invention, that is adapted primarily for the skimming of floating sludge in the treatment of sewage; and Figure 2 is a longitudinal section of the above construction in elevation, the section being taken on the line 2—2 of Fig. 1.

Similar reference numerals refer to similar parts throughout both views.

In the form of my invention that has been selected for the purpose of illustration, I have shown, in somewhat distorted proportions, a flotation tank 5; wherein solid matter or other material that is of less specific gravity than the pregnant fluid 6 may be permitted to rise to the surface thereof and to float thereon. This tank has a submerged inlet pipe 7 at one end, and a similar submerged outlet pipe 8 at the other end. Opposite the inner ends of these pipes, and in fairly close proximity thereto, are underflow weirs 9 and 10 respectively, extending clear across the tank transversely, and slightly above the normal surface level of the fluid therein. At each end of the tank is an overflow weir, as shown at 11 and 12. These are adapted to overflow into launders 13 and 14 respectively, and the launders are adapted for being discharged through pipes 15.

At the center of the tank, and extending transversely thereof from side to side, is a cylindrical trough 16 that is partially submerged in the fluid contained in the tank. This trough is partly rotatable about its axis, by means of a lever 17, and it is angularly positionable by means of a fixed slotted quadrant 18 and thumb nut 19. This cylindrical trough has a longitudinal aperture of considerable width, extending throughout practically the whole of its length. The lips 20 of this aperture are symmetrically positioned with respect to lever 17, and they serve as variably positionable overflow weirs, over which the flotage in the tank may be passed during the skimming operation.

For removing the skimmed flotage from the interior of trough 16, a suction pipe 21 may be led into the interior of the trough axially, at one end, and be continued down to the bottom of the trough, as by means of a downwardly turned elbow 22, and a short nipple (not shown) depending therefrom.

Such a cylindrical trough as that described, may very conveniently be rotatably mounted at one end upon pipe 21. At the other end a similar pipe may be utilized, or the trough may be rotatably mounted upon a trunnion 23. The lever 17 is affixed to one end of the trough for rotating it, and for holding it in any desired position by means of quadrant 18 and nut 19.

A compressed air header 24, having a plurality of short lateral nozzles 25 connected into it, is located at or above each of the underflow weirs 9 and 10, in close proximity thereto and on the inside thereof. These headers are connected to a suitable compressed air supply pipe 26, through slide gates 27, by which their operation may be controlled. Other compressed air headers 28, with similar lateral nozzles 29, may be correspondingly connected to supply pipe 26 through slide gates 30. These last mentioned headers are not essential in most cases, but their use may be very desirable for certain purposes that will be described below. If they are utilized, they should be located close to rotatable trough 16, at either side thereof.

The outlets of all of the nozzles mentioned, namely, those shown at 25 and 29, should be close to the normal level of the surface of the fluid to be skimmed, said level being substantially at the edge of overflow weirs 11 and 12. These nozzles are directed downwardly at a slight angle as indicated, so that the air jets issuing therefrom will be adapted to blow the flotage that is within the central compartment of the tank, toward the center thereof.

The operation of my improved skimming apparatus may be described as follows:—

Assume that the fluid to be skimmed enters the tank through inlet pipe 7, and that it contains material that it is desired to get rid of, such as flocculent sludge in sewage. Such material has a lighter specific gravity than that of the pregnant fluid, and will tend to rise and float thereon. A considerable portion of the undesired material may be disposed of at once, in the left-hand compartment 31 of the tank, before passing the underflow weir 9. Obviously the cross-sectional area of the tank is much greater than that of inlet and outlet pipes, and there is a very low velocity therein. Consequently ample time is provided for much of the flocculent material to rise to the surface in compartment 31, and it will overflow weir 11 into launder 13, and be discharged through pipe 15.

Between the underflow weirs 9 and 10, which are spaced at a relatively great distance from each other, ample time is provided for such floatable material as remains in the fluid, to rise to the surface thereof in the central compartment 32 of the tank. Such flotage will form a scum on the surface of the fluid in the central compartment, which may be skimmed off from time to time. This may be accomplished by means of rotatable trough 16 and air nozzles 25.

In the form of the invention selected for illustration, one-half of central compartment 32 is skimmed at a time; the lever 17 being shifted to its alternate position after skimming the first half, and the process then being repeated.

It will be observed that headers 24 and 28 are located just above the normal level of the fluid in the tank, and that nozzles 25 and 29 slope only slightly downwardly, consequently the blast from the nozzles is directed along the surface of the fluid to blow the flotage thereon toward central cylindrical trough 16. Very rapid skimming of the flotage may be accomplished in this manner.

In certain uses it is desirable to secure the flotage in a highly concentrated form, instead of wasting it, and mixed with as little of the pregnant fluid as possible. My construction permits of this being accomplished by so adjusting lever 17 that the active lip 20 of the rotatable trough will be slightly above the normal level of the fluid in the tank. In such a case the use of headers 28 is essential, for blowing the flotage over the raised lip in the manner indicated at 33. Very little of the pregnant fluid will go over with the flotage, if the height of the lip above that of the fluid is properly adjusted.

In any case, the material that is passed into the cylindrical trough 16 may be removed therefrom through pipe 21, by pumping.

After the fluid in the tank has been skimmed in the above manner, it still will have to pass under the underflow weir 10 near the outlet, and then rise to outlet pipe 8. In the right-hand compartment 34, opportunity is afforded for any floatable material that may still be contained in the fluid, to rise to the surface thereof, and to overflow weir 12. The effluent passing out of discharge pipe 8 can thus be made very free from floatable material.

Obviously, my invention may be utilized in various modified forms, without departing from the essence thereof. Many such modifications are contemplated by me, and they will readily suggest themselves to those familiar with the art, in the light of this disclosure.

Having thus fully describing my invention, I claim:

1. Skimming apparatus comprising; a flotation tank having an overflow weir of variable level consisting of a lip of a rotatable cylindrical trough; means for blowing flotage on the fluid within said tank toward said weir; independent means adjacent the weir for blowing said flotage thereover when the weir is slightly above the fluid level, and thence into said trough; and an axial tube leading into said trough, through which the contents thereof may be removed.

2. Skimming apparatus comprising; a flotation tank; a central transverse cylindrical trough within the tank, having lips adapted to act as overflow weirs, and that is rotatable about its axis; a transverse tubular header having a plurality of lateral nozzles, adjacent each end of the tank, whereby flotage on the fluid therein may be blown toward said trough; and means for removing the contents of said trough.

3. Skimming apparatus comprising; a flotation tank; a central transverse cylindrical trough within the tank, having lips adapted to act as overflow weirs, and that is rotatable about its axis; a transverse tubular header having a plurality of lateral nozzles, adjacent each end of the tank, whereby flotage on the fluid therein may be blown toward said trough; a similar header with nozzles, adjacent each side of the trough, whereby said flotage may be blown over a lip of the trough; and an axial tube leading into said trough, through which the contents of the trough may be removed.

4. Skimming apparatus comprising; a flotation tank having a submerged inlet and outlet at its respective ends; an overflow weir at each end of the tank; an underflow weir spaced from each end of the tank, extending transversely of the tank thereacross, and above the normal level of the fluid therein; a central transverse cylindrical trough within the tank, having lips adapted to act as overflow weirs at substantially the normal level of said fluid, and that is rotatable about its axis; means for blowing flotage on said fluid toward and over said lips into said trough; and an axial tube leading into said trough, through which the contents thereof may be removed.

FRANK S. CURRIE.